Sept. 1, 1942.   L. DEL RICCIO   2,294,423
PHOTOGRAPHIC APPARATUS
Filed Aug. 3, 1940
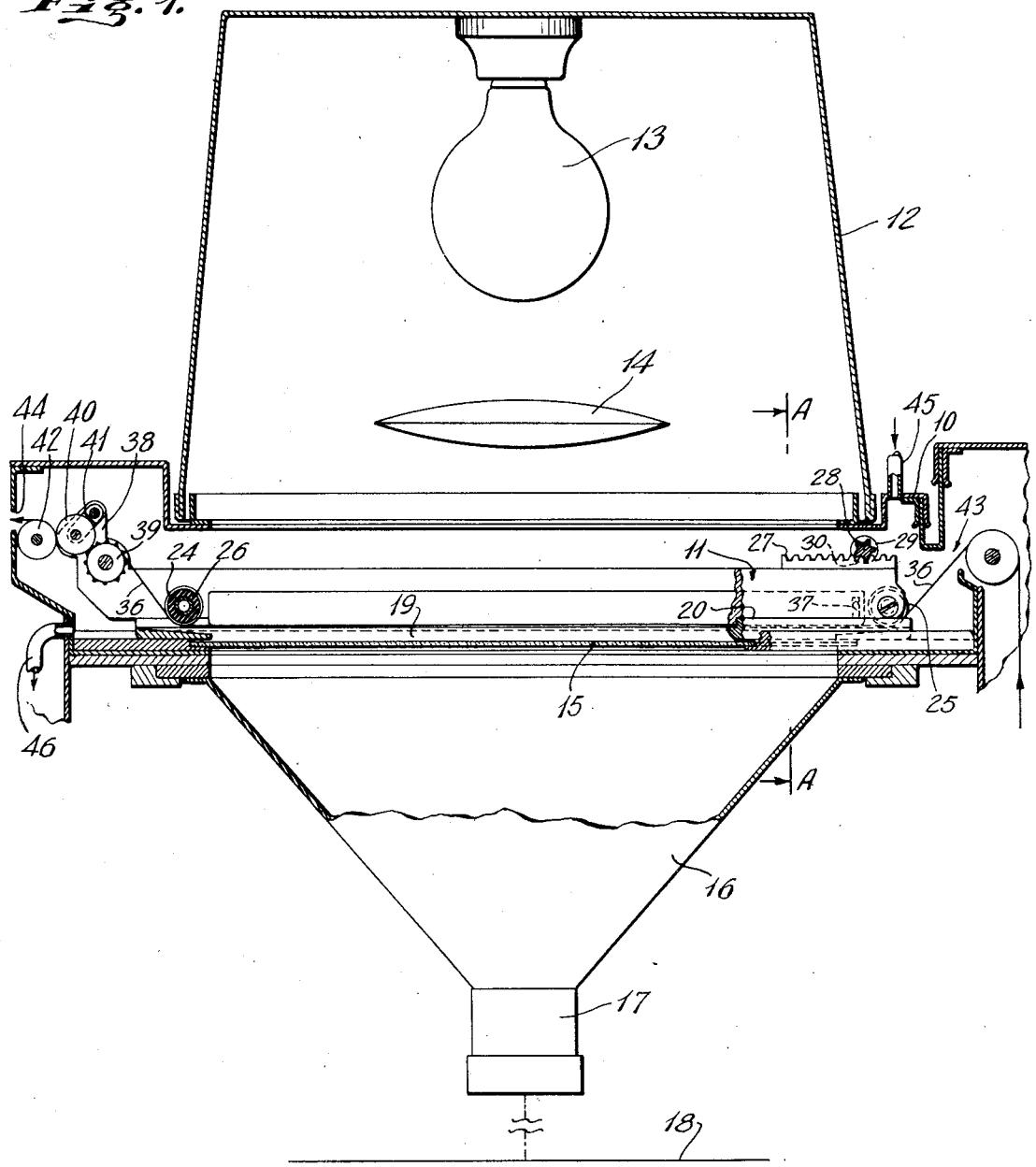
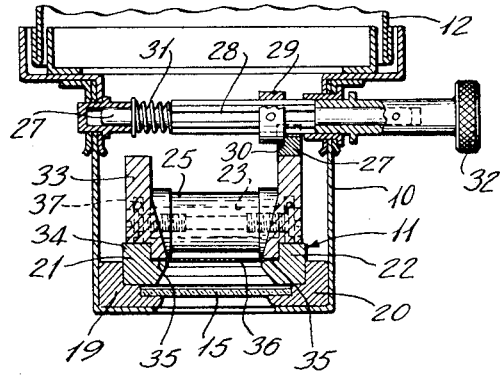
INVENTOR
LORENZO DEL RICCIO
BY Hornidge and Dowell
ATTORNEYS Patented Sept. 1, 1942

2,294,423

UNITED STATES PATENT OFFICE 2,294,423

PHOTOGRAPHIC APPARATUS

Lorenzo del Riccio, Los Angeles, Calif.

Application August 3, 1940, Serial No. 350,346
In Great Britain August 26, 1939

4 Claims. (Cl. 95—94)

The invention relates to apparatus in which the image from a moving film is projected on a stationary screen, and whereby the image is rendered stationary when a selected part of the projected image has reached a selected position on the screen, and has special application in the making of photographic records of the finishes of horse races. In this connection the speed with which a print, preferably in enlarged form, of such finish of the race may be submitted to the judges of the race is a matter of the highest importance and desirability. For this purpose the film which is preferably in the form of a strip of the usual 35 millimeter film used in motion picture apparatus and provided with sprocket holes along its margins, after exposure in the camera, is caused to travel through tanks containing the treating solutions whereby the latent image is developed, fixed and the film washed, after which a positive print may be made by projection from the negative thus obtained.

It is an object of my invention to provide apparatus through which the film is caused to travel, having been washed, developed and wholly or partially fixed, and whereby, during a pause in the course of such travel, the images on said film are projected upon said screen or upon a sensitive surface superimposed upon said screen. When the image projected from the traveling film moves fairly fast across the screen, difficulty is experienced in stopping the film at exactly the right moment to bring the selected part of the image to the selected position on the screen. The apparatus according to this invention therefore comprises a carrier supporting film guiding means into which the film is fed at one end and taken off at the other, the carrier being mounted for slidable movement upon a support longitudinally of the direction of travel of the film, and is provided with locking means which lock the carrier in a definite position with respect to its support. The locking means may be released and the position of the carrier may be manually adjusted with respect to its support longitudinally of the direction of travel of the film.

A further object of the invention is to permit the image on the film to be projected concurrently with the completion of the operation of fixing the image on the film, and for that purpose the apparatus comprises a tank within which the slidable carrier and its support are mounted, and to which a hypo solution is fed, the top of said tank being open, while its bottom is composed for a portion of its length of a clear transparent glass plate to permit illumination from above to pass through the submerged film to and through a projecting lens.

Other and further objects and advantages of the invention will be apparent from the following description of it taken in connection with the accompanying drawing in which Fig. 1 is a longitudinal section of the apparatus, and Fig. 2 is a section on the line A—A of Fig. 1.

Referring to the drawing, 10 is a tank of sufficient length to provide the proper length of time in which the final step of fixing may be completed in accordance with the speed of travel of the film therethrough, and to allow requisite room for the longitudinal adjustment of the film carrier 11 located therein. The said tank should be light-proof construction, except as hereinafter specified. On the top of said tank there is detachably mounted, with a light proof seal, a hood 12, containing suitable illuminating means such as the lamp 13 and provided with an interior reflecting surface to direct the light of the lamp downward through the tank 10. Enclosed within said hood 12 there may be installed a suitable condenser 14 to concentrate said light. The bottom of the tank, for the greater portion of its length, is formed of a plate 15 of clear transparent glass. A second light-tight hood 16 extends downward from the said glass bottom of the tank, in the lower end of which is mounted a projecting lens 17 at a distance from the plane of the film in the carrier 11 which is located in the tank, equal to its focal length, with suitable accommodation for the adjustment of said lens in accordance with the degree of enlargement of the image on the film that will be projected by said lens upon the screen 18.

Secured within and at the bottom of said tank are a pair of parallel rails 19 and 20 of L shaped cross section upon which is slidably mounted the carrier 11. Said carrier is of open construction for substantially the greater part of its length to permit the passage of light from the lamp 13 therethrough, and is composed of two parallel longitudinal members 21 and 22 joined together at their ends by suitable cross members 23 and 24 which rotatably support the rollers 25 and 26 hereinafter described. The undersides of the longitudinal members 21 and 22 are shaped to conform with said rails 19 and 20, respectively, whereby said carrier when in position thereon is prevented from lateral movement with respect to said rails. Fixed to the upper side of the longitudinal member 22 of said carrier is a rack 27 adapted to be engaged by the pinion 28.

Said pinion 28 is rotatably mounted at one end of the tank 10 in mesh with the rack 27. Said pinion is provided with a collar 29 adapted to rest normally in a conforming arcuate recess 30, approximating a semi-circle, located in the face of the rack 27 and having a diameter very little greater than that of the collar 29, in which position it is normally held by the coil spring 31 and in this position it serves to lock the carrier 11 against longitudinal movement on the rails 19 and 20. Said pinion 28 is movable axially, and, by pressure on the knob 32 attached to the end of said pinion and located outside the tank 10, the said collar 29 may be disengaged from the arcuate recess 30 whereby the said carrier is unlocked and may then be moved longitudinally on the rails 19 and 20 by means of the pinion 28 manually rotated by the knob 32.

The carrier 11 may be divided longitudinally into upper and lower portions 33 and 34 to facilitate the threading of the film 36 therethrough, space being provided between these two portions as at 35 to permit the passage of said film. Said portions are maintained in proper relative position by means of the dowel pin 37.

Rollers 25 and 26 rotatably mounted on the respective cross members 23 and 24 serve to guide the film 36 longitudinally through the carrier 11. In the upwardly extending and opposed brackets 38 formed on the ends of the longitudinal members 21 and 22, in which is located the guide roller 26, is journalled a motor driven sprocket 39 having associated therewith a pressure roller 40 mounted on the end of a pivoted arm 41. Another roller 42 serves to guide the film out of the tank 10.

The film 36 is introduced into the tank 10 through the opening 43 communicating with the previous treating tank and after passing under the guide roller 25 it is drawn along the length of the carrier through the space 35 and under the guide roller 26 by means of the motor driven sprocket 39, and is delivered out of the tank through the slot 44.

A circulatory flow of hypo solution enters the tank 10 at the top through the pipe 45 and leaves it at the bottom through the pipe 46. Care must be taken that the hypo solution be very clear and that its flow through the tank 10 be very gentle so as to produce no ripples or other visible motion which might produce distortion in the image projected on the screen 18. If preferred the circulation of the hypo solution may be dispensed with at least during the printing operation.

The weight of the carrier 11, which is preferably made of suitable metal, will be ordinarily sufficient to maintain it in position on the rails 19 and 20 against any tendency of the film 36 which may be led to and from the carrier at higher levels than those of the guide rollers 25 and 26, to lift it therefrom.

The operation of the apparatus which should be conducted in a photographic dark room is as follows:

The hood 12 containing the lamp 13 is removed and a strip of film as a leader is threaded through under the guide roller 25, through the space 35, under the guide roller 26 and between the sprocket 39 and the pressure roller 40, after which the hood is replaced and the light may be turned on. The leader strip is then connected to the film or a leader therefor in the last treating tank which may be a preliminary fixing bath to clear the images and render them transparent for projection purposes. The motor is then put in operation to drive the sprocket 39 and as the film is drawn through the carrier 11 the images thereon in enlarged form are projected through the lens on the screen 18, where they are seen to travel in an opposite direction. When a desired part of the film comes into view the motor is switched off and further travel of the film stops. If so desired the motor switch and the pinion knob may be interconnected so that the withdrawal of the collar 29 from the recess 30 opens the motor switch. At the ordinary rate of speed at which the film travels it will be found often that the desired portion of the film has travelled too far, or it may be for other reasons desirable to adjust the film images with respect to their location on the screen 18. The operator thereupon pushes in the knob 32, thus withdrawing the collar 29 from its position within the arcuate recess 30 in the rack 27 whereby it had held the carrier locked against longitudinal movement with respect to the rails, so that by then rotating the knob 32 the image on the screen may be moved back or forth to a desired position. The lamp is then turned off, a piece of sensitized paper placed upon the screen upon which the image is again projected by turning on the light to properly expose it, after which the exposed paper is processed by the usual methods to produce an enlarged positive of the images on the film.

It is to be noted that during all this time the film is undergoing the completion of the fixing process in the tank and that thereby much time is saved as compared with previous methods in which the film was first completely fixed, washed and sometimes dried before a print was made.

It will be understood that to avoid parallax error, there may be placed upon the screen 18 a fixed mark into register with which a selected part of the image is to be brought, and the lens 17 must be aligned and accurately and positively located with respect to said mark.

It is obvious that many changes may be made without departing from the spirit of my invention as defined in the appended claims.

What I claim is:

1. Apparatus for projecting the images on a photographic film, comprising a light source, a projecting lens, a carrier for said film slidably mounted on a support, means for driving said film through said carrier and means for selectively adjusting the position of said carrier longitudinally of said support and locking said carrier to said support, said means comprising an axially movable pinion in mesh with a rack on said carrier and a member carried by said pinion which in one position of said pinion engages a recess in said carrier to lock said carrier to said support and in another axially removed position of said pinion is disengaged from said recess.

2. In apparatus for the successive processing and projection of a travelling photographic film wherein the image on the film may be projected by an optical system while said film is submerged in one of the processing tanks, means for adjusting the position of said film with respect to said optical system, said means comprising a pair of horizontal rails positioned in the bottom of said tank, a film carrier slidable on said rails, an axially movable pinion in mesh with a rack on said carrier and a member carried by said pinion which in one position of said pinion engages a recess in said carrier to lock said carrier to said support and in another axially removed position of said pinion is disengaged from said recess.

3. In apparatus for the successive processing and projection of a travelling photographic film wherein the image on the film may be projected by an optical system while said film is submerged in one of the processing tanks, means for adjusting the position of said film with respect to said optical system, said means comprising a pair of horizontal rails positioned in the bottom of said tank, a film carrier slidable on said rails and provided with grooves to receive the margins of said travelling film, means carried by said film carrier for guiding said film into and out of said grooves, an axially movable pinion in mesh with a rack on said carrier and a member carried by said pinion which in one position of said pinion engages a recess in said carrier to lock said carrier to said support and in another axially removed position of said pinion is disengaged from said recess.

4. In apparatus for the successive processing and projection of a travelling photographic film wherein the image on the film may be projected by an optical system while said film is submerged in one of the processing tanks, means for adjusting the position of said film with respect to said optical system, said means comprising a pair of horizontal rails positioned in the bottom of said tank, a film carrier slidable on said rails and provided with grooves to receive the margins of said travelling film, means carried by said film carrier for guiding said film into and out of said grooves, an axially movable pinion in mesh with a rack on said carrier and a circular member carried by said pinion which in one position of said pinion engages a semi-circular recess in said carrier to lock said carrier to said support and in another axially removed position of said pinion is disengaged from said recess.

LORENZO DEL RICCIO.